United States Patent
Hakola et al.

(10) Patent No.: US 12,369,142 B2
(45) Date of Patent: Jul. 22, 2025

(54) BEAM MANAGEMENT IN CELLULAR COMMUNICATION NETWORKS

(71) Applicant: Nokia Technologies Oy, Espoo (FI)

(72) Inventors: Sami-Jukka Hakola, Kempele (FI); Timo Koskela, Oulu (FI); Juha Pekka Karjalainen, Sotkamo (FI); Keeth Saliya Jayasinghe Laddu, Espoo (FI)

(73) Assignee: Nokia Technologies Oy, Espoo (FI)

(*) Notice: Subject to any disclaimer, the term of this patent is extended or adjusted under 35 U.S.C. 154(b) by 428 days.

(21) Appl. No.: 17/997,797

(22) PCT Filed: Mar. 15, 2021

(86) PCT No.: PCT/FI2021/050182
§ 371 (c)(1),
(2) Date: Nov. 2, 2022

(87) PCT Pub. No.: WO2021/229140
PCT Pub. Date: Nov. 18, 2021

(65) Prior Publication Data
US 2023/0224866 A1    Jul. 13, 2023

Related U.S. Application Data

(60) Provisional application No. 63/024,116, filed on May 13, 2020.

(51) Int. Cl.
*H04W 72/02* (2009.01)
*H04W 72/044* (2023.01)
*H04W 72/563* (2023.01)

(52) U.S. Cl.
CPC ......... *H04W 72/02* (2013.01); *H04W 72/046* (2013.01); *H04W 72/563* (2023.01)

(58) Field of Classification Search
CPC ... H04W 72/02; H04W 72/046; H04W 72/56; H04W 72/563; H04B 7/022;
(Continued)

(56) References Cited

U.S. PATENT DOCUMENTS

| | | |
|---|---|---|
| 2018/0227777 A1 | 8/2018 | Sun et al. |
| 2019/0239093 A1 | 8/2019 | Zhang et al. |

(Continued)

FOREIGN PATENT DOCUMENTS

| | | |
|---|---|---|
| CN | 110192376 A | 8/2019 |
| CN | 110391890 A | 10/2019 |

(Continued)

OTHER PUBLICATIONS

Office action received for corresponding Indian Patent Application No. 202247071144, dated Jan. 31, 2023, 6 pages.
(Continued)

*Primary Examiner* — Mohammad S Adhami
*Assistant Examiner* — Samuel Dilan Rutnam
(74) *Attorney, Agent, or Firm* — Barta Jones, PLLC

(57) ABSTRACT

According to an example aspect of the present invention, there is provided a method comprising, determining at least one anchor control resource set among a plurality of control resource sets, wherein each of the at least one anchor control resource set defines a spatial source for multiple signal types, said multiple signal types comprising different downlink and uplink signals and channels, determining whether or not a given signal type is to inherit a spatial source of one of the at least one anchor control resource set and applying, in case of a positive determination, the spatial source of the at least one anchor control resource set for at least one signal of the given signal type.

10 Claims, 5 Drawing Sheets

(58) Field of Classification Search
CPC ... H04B 7/0695; H04L 5/0048; H04L 5/0053; H04L 5/0064; H04L 5/0091; H04L 5/0023
See application file for complete search history.

(56) References Cited

U.S. PATENT DOCUMENTS

| | | | |
|---|---|---|---|
| 2019/0239212 | A1 | 8/2019 | Wang et al. |
| 2020/0100222 | A1 | 3/2020 | Chakraborty et al. |
| 2020/0100311 | A1 | 3/2020 | Cirik et al. |
| 2020/0145081 | A1 | 5/2020 | Zhou et al. |
| 2022/0070704 | A1* | 3/2022 | Khoshnevisan ...... H04W 72/56 |
| 2024/0251416 | A1* | 7/2024 | Kim ................... H04W 72/0466 |

FOREIGN PATENT DOCUMENTS

| | | | | |
|---|---|---|---|---|
| CN | 110832919 | A | 2/2020 | |
| CN | 111148239 | A | 5/2020 | |
| EP | 3989458 | A1 * | 4/2022 | ........... H04B 7/0617 |
| WO | 2019/193581 | A2 | 10/2019 | |
| WO | WO-2022178074 | A1 * | 8/2022 | ........... H04L 5/0023 |
| WO | WO-2023282623 | A1 * | 1/2023 | ............ H04B 7/024 |

OTHER PUBLICATIONS

Extended European Search Report received for corresponding European Patent Application No. 21803055.9, dated Aug. 29, 2023, 8 pages.

"Multi-TRP Enhancements", 3GPP Tsg-Ran WG1 Meeting #99, R1-1912967, Agenda: 7.2.8.2, Qualcomm Incorporated, Nov. 18-22, 2019, pp. 1-21.

"Feature lead summary of Enhancements on Multi-beam Operations", 3GPP TSG RAN WG1 Meeting #99, R1-1912277, Agenda: 7.2.8.3, LG Electronics, Nov. 18-22, 2019, pp. 1-34.

"New WID: Further enhancements on MIMO for NR", 3GPP TSG RAN Meeting #86, RP-193133, Agenda: 9.1.1, Samsung, Dec. 9-12, 2019, 5 pages.

Takeda et al., "Understanding the Heart of the 5G Air Interface: An Overview of Physical Downlink Control Channel for 5G New Radio (NR)", arXiv, Oct. 3, 2019, pp. 1-8.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NR; Physical layer procedures for data (Release 16)", 3GPP TS 38.214, V16.0.0, Dec. 2019, pp. 1-148.

International Search Report and Written Opinion received for corresponding Patent Cooperation Treaty Application No. PCT/FI2021/050182, dated Jun. 3, 2021, 17 pages.

"3rd Generation Partnership Project; Technical Specification Group Radio Access Network; NR; Physical layer procedures for control (Release 16)", 3GPP TS 38.213, V16.1.0 , Mar. 2020, pp. 1-156.

Office action received for corresponding European Patent Application No. 21803055.9, dated Mar. 19, 2025, 7 pages.

"Remaining Issues on Beam Management", 3GPP TSG RAN WG1 Meeting #93, R1-1806507, Agenda item: 7.1.2.2.3, Intel Corporation, May 21-25, 2018, pp. 1-8.

Office Action received for corresponding Chinese Patent Application No. 202180061422.8, dated Mar. 27, 2025, 11 pages of Office action and no page of translation available.

"Running RRC CR for Introduction of NR eMIMO", 3GPP TSG-RAN WG2 Meeting #109 electronic, R2-2001109, Ericsson, Feb. 24-Mar. 6, 2020, 61 pages.

* cited by examiner

510 Determining at least one anchor control resource set among a plurality of control resource sets, wherein each of the at least one anchor control resource set defines a spatial source for multiple signal types, said multiple signal types comprising different downlink and uplink signals and channels

520 Transmitting downlink signals and receiving uplink signals of said multiple signal types according to a spatial source of the at least one anchor control resource set

FIGURE 5

BEAM MANAGEMENT IN CELLULAR COMMUNICATION NETWORKS

RELATED APPLICATION

This application was originally filed as a Patent Cooperation Treaty Application No. PCT/FI2021/050182 filed on Mar. 15, 2021, which claims priority from U.S. Provisional Patent Application No. 63/024,116 filed on May 13, 2020, which are hereby incorporated in their entirety.

FIELD

Various example embodiments relate in general to cellular communication networks and more specifically, to beam management in such networks.

BACKGROUND

Beam management may refer to a set of functionalities that can be used to enhance operation of beam-based wireless communication systems. Beam management may be used for example in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to beam management. According to the discussions there is a need to provide improved methods, apparatuses and computer programs related to beam management.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided an apparatus comprising at least one processing core, at least one memory including computer program code, the at least one memory and the computer program code being configured to, with the at least one processing core, cause the apparatus at least to perform, determine at least one anchor control resource set among a plurality of control resource sets, wherein each of the at least one anchor control resource set defines a spatial source for multiple signal types, said multiple signal types comprising different downlink and uplink signals and channels, determine whether or not a given signal type is to inherit a spatial source of one of the at least one anchor control resource set and apply, in case of a positive determination, the spatial source of the at least one anchor control resource set for at least one signal of the given signal type.

The apparatus of the first aspect may be a user equipment or a mobile termination part of a relay, or a control device configured to control the functioning thereof, possibly when installed therein.

Embodiments of the first aspect may comprise at least one feature from the following bulleted list or any combination of the following features:

- the spatial source of said one of the at least one anchor control resource set defines a transmission configuration indication state for the given signal type;
- only a subset of all signal types inherits the spatial source of the at least one anchor control resource set;
- the spatial source of said one of the at least one anchor control resource set is applied regardless of a scheduling offset when the apparatus is configured and activated with the at least one anchor control resource set;
- the spatial source of said one of the at least one anchor control resource set is applied regardless of whether said one of the at least one anchor control resource set is a control resource set with a lowest identity;
- the at least one anchor control resource set comprises only one anchor control resource set and the spatial source of said one anchor control resource set is a single spatial source for said multiple signal types;
- the at least one anchor control resource set comprises multiple anchor control resource sets in one cell, said multiple anchor control resource sets having a different priority;
- a control resource set number zero has the highest priority;
- multiple control resource sets are grouped in multiple groups, and one control resource set in each group is assigned as the anchor control resource set for the group and other control resource sets in the group inherit the spatial source from the assigned anchor control resource set of the group;
- each group is associated with a different transmission and reception point;
- the at least one memory and the computer program code are further configured to, with the at least one processing core, cause the apparatus at least to perform, determine, when a scheduling offset is less than a threshold, a default beam depending on whether the at least one anchor control resource set is configured and activated;
- the at least one anchor control resource set is a control resource set of a serving cell and the apparatus is configured with an additional anchor control resource set of a non-serving cell, a priority of the additional anchor control resource set of the non-serving cell being less than a highest priority anchor control resource set of the serving cell but higher than a priority of any other anchor control resource set;
- the additional anchor control resource set of a non-serving cell is activated based on an activation command received from the non-serving cell;
- the apparatus is a user equipment or a mobile termination part of a relay, or a control device configured to control the functioning thereof.

According to a second aspect of the present invention, there is provided an apparatus comprising at least one processing core, at least one memory including computer program code, the at least one memory and the computer program code being configured to, with the at least one processing core, cause the apparatus at least to perform, determine at least one anchor control resource set among a plurality of control resource sets, wherein each of the at least one anchor control resource set defines a spatial source for multiple signal types, said multiple signal types comprising different downlink and uplink signals and channels and transmit downlink signals and receive uplink signals of said multiple signal types according to a spatial source of the at least one anchor control resource set.

The apparatus of the second aspect may be a base station or a distributed unit part of a relay, or a control device configured to control the functioning thereof, possibly when installed therein.

Embodiments of the second aspect may comprise at least one feature from the following bulleted list or any combination of the following features:
- the spatial source of the at least one anchor control resource set defines a transmission configuration indication state for the given signal type;
- only a subset of all signal types inherits the spatial source of the at least one anchor control resource set;
- the at least one anchor control resource set comprises only one anchor control resource set and the spatial source of said one anchor control resource set provides a single spatial source for said multiple signal types;
- the at least one anchor control resource set comprises multiple anchor control resource sets in one cell of the apparatus, said multiple anchor control resource sets having a different priority;
- a control resource set number zero has the highest priority;
- the apparatus is a base station or a distributed unit part of a relay, or a control device configured to control the functioning thereof.

According to a third aspect of the present invention, there is provided an apparatus comprising means for determining at least one anchor control resource set among a plurality of control resource sets, wherein each of the at least one anchor control resource set defines a spatial source for multiple signal types, said multiple signal types comprising different downlink and uplink signals and channels, means for determining whether or not a given signal type is to inherit a spatial source of one of the at least one anchor control resource set and means for applying, in case of a positive determination, the spatial source of the at least one anchor control resource set for at least one signal of the given signal type.

The apparatus of the third aspect may be a user equipment or a mobile termination part of a relay, or a control device configured to control the functioning thereof, possibly when installed therein.

According to a fourth aspect of the present invention, there is provided an apparatus comprising means for determining at least one anchor control resource set among a plurality of control resource sets, wherein each of the at least one anchor control resource set defines a spatial source for multiple signal types, said multiple signal types comprising different downlink and uplink signals and channels and means for transmitting downlink signals and means for receiving uplink signals of said multiple signal types according to a spatial source of the at least one anchor control resource set.

The apparatus of the fourth aspect may be a base station or a distributed unit part of a relay, or a control device configured to control the functioning thereof, possibly when installed therein.

According to a fifth aspect, there is provided a first method comprising, determining at least one anchor control resource set among a plurality of control resource sets, wherein each of the at least one anchor control resource set defines a spatial source for multiple signal types, said multiple signal types comprising different downlink and uplink signals and channels, determining whether or not a given signal type is to inherit a spatial source of one of the at least one anchor control resource set and applying, in case of a positive determination, the spatial source of the at least one anchor control resource set for at least one signal of the given signal type.

The first method may be performed by a user equipment or a mobile termination part of a relay, or a control device configured to control the functioning thereof, possibly when installed therein.

According to a sixth aspect, there is provided a second method comprising, determining at least one anchor control resource set among a plurality of control resource sets, wherein each of the at least one anchor control resource set defines a spatial source for multiple signal types, said multiple signal types comprising different downlink and uplink signals and channels and transmitting downlink signals and receiving uplink signals of said multiple signal types according to a spatial source of the at least one anchor control resource set.

The second method may be performed by a base station or a distributed unit part of a relay, or a control device configured to control the functioning thereof, possibly when installed therein.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

BRIEF DESCRIPTION OF THE DRAWINGS

FIG. 5 illustrates a flow graph of a second method in accordance with at least some embodiments.

EMBODIMENTS

Embodiments of the present invention provide improvements for beam management procedures, e.g., for cellular communication networks. According to the embodiments of the present invention, at least one anchor Control Resource Set, CORESET, may be assigned for multiple signal types, such as certain downlink and uplink signals and channels, and said multiple signal types may inherit a spatial source of the at least one anchor CORESET. The inherited spatial source may be associated with a current active Transmission Configuration Indication, TCI, state of the at least one anchor CORESET. That is to say, it may be assumed that said multiple signal types and the at least one anchor CORESET are Quasi-Co Located, QCL'ed. The spatial source of the at least one anchor CORESET may be therefore applied for said multiple signal types. Consequently, a simple and efficient beam management procedure with low overhead is provided, which enables improved intra-cell mobility for example.

Figure 1:
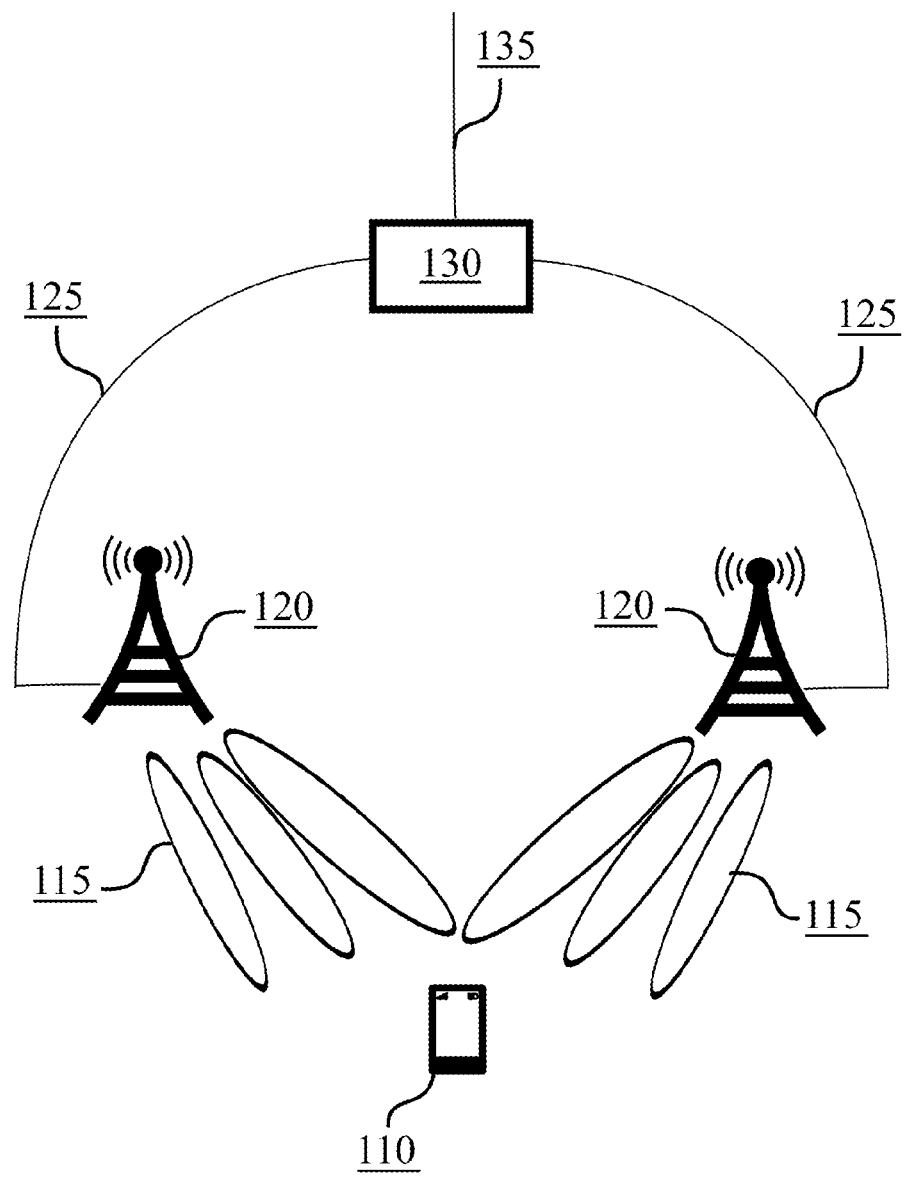
FIG. 1 illustrates an exemplary network scenario in accordance with at least some embodiments.

FIG. 1 illustrates an exemplary network scenario in accordance with at least some embodiments. According to the example scenario of FIG. 1, there may be a beam-based wireless communication system, which comprises User Equipment, UE, 110, one or more Base Stations, BSs, 120, and core network element 130. UE 110 may be connected to BS 120 via air interface using beams 115. BS 120 may be a network entity that configures some or all control information of UE 110 and allocates resources for UE 110. In some example embodiments, BS 120 may refer to a Transmission and Reception Point, TRP, or comprise multiple TRPs that may be co-located or non-co-located. So for example FIG. 1 may demonstrate a multi-TRP scenario, if BSs 120 are considered as TRPs.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, another kind of suitable wireless terminal. In the example system of FIG. 1, UE 110 may communicate wirelessly with a cell of BS 120 via at least one beam 115. BS 120 may be considered as a serving BS for UE 110 and the cell of BS 120 may be a serving cell for UE 110. Air interface between UE 110 and BS 120 may be configured in accordance with a Radio Access Technology, RAT, which both UE 110 and base station 120 are configured to support.

Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, embodiments of the present invention are not restricted to any particular wireless technology. Instead, embodiments may be exploited in any beam-based wireless communication system.

BS 120 may be connected, directly or via at least one intermediate node, with core network 130 via interface 125. Core network 110 may be, in turn, coupled via interface 135 with another network (not shown in FIG. 1), via which connectivity to further networks may be obtained, for example via a worldwide interconnection network. BS 120 may be connected with at least one other BS as well via an inter-base station interface (not shown in FIG. 1), even though in some embodiments the inter-base station interface may be absent. BS 120 may be connected, directly or via at least one intermediate node, with core network 130 or with another core network.

In some example embodiments of the present invention, the exemplary network scenario may comprise a relay instead of, or in addition to, UE 110 and/or BS 120. Relaying may be used for example when operating on millimeterwave frequencies. One example of the relay may be an Integrated Access and Backhaul, IAB, node. The IAB node may be referred to as a self-backhauling relay as well. Another example of a relay may be an out-band relay. In general, the relay node may comprise two parts:

1) Distributed Unit, DU, part which may facilitate functionalities of BS 120, such as a gNB. Thus, in some example embodiments, the DU part of a relay may perform tasks of BS 120.
2) Mobile Termination, MT, part which may facilitate functionalities of a UE, i.e., a backhaul link which may be the communication link between a parent node (DU), such as a DU part of BS 120, and the relay, such as an IAB node. In some embodiments, the MT part may be referred to as a IAB-UE as well, i.e., the relay may correspond to a UE partly and perform tasks of UE 110.

At least some example embodiments of the present invention relate to beam management. In general, beam management may refer to a set of functionalities to assist UE 110 to set its receive, RX, and transmit, TX, beams for downlink receptions and uplink transmissions, respectively. Such a set of functionalities may comprise for example beam indication, beam measurements and reporting, beam recovery and beam tracking and refinement.

Beam management may be particularly useful at higher carrier frequencies (such as above 6 GHZ), because UEs operating on such frequencies are typically equipped with one or multiple antenna arrays or antenna modules per digital input and both transmission and reception beam pattern per digital input are more narrow than omni-directional beam pattern typically used at below 6 GHz. Nevertheless, example embodiments of the present invention may be applied in any beam-based wireless communication system, regardless of the used carrier frequency.

QCL indication functionality may be exploited for beam management. Two antenna ports may be considered as QCL'ed if properties of a channel over which a symbol is transmitted via a first antenna port can be derived from channel over which a symbol is transmitted via a second antenna port. Regarding downlink beam indication, QCL indication functionality may be defined as follows. The principle to receive a certain physical signal or physical channel may be that UE 110 is either configured with or UE 110 implicitly determines a source/reference RS that UE 110 has received and measured earlier which defines how to set a RX beam of UE 110 for the reception of the downlink (target) physical signal or channel to be received. To provide UE 110 with QCL characteristics for the target signal (to be received) a TCI framework may be used.

According to the TCI framework UE 110 may be configured with TCI state(s) to provide UE 110 with source RS(s) for determining QCL characteristics. Each TCI state may include for example one or two source RSs that provide UE QCL TypeA, TypeB, TypeC and/or TypeD parameters, e.g., as follows:

QCL-TypeA: {Doppler shift, Doppler spread, average delay, delay spread}
QCL-TypeB: {Doppler shift, Doppler spread}
QCL-TypeC: {Doppler shift, average delay}
QCL-TypeD: {Spatial Rx parameter}

TCI states may be transmitted to UE 110 in a downlink control message for example, the downlink control message comprising configurations such as QCL-relationships between the downlink RSs in one Channel State Information-Reference Signal, CSI-RS, set and the Physical Downlink Shared Channel, PDSCH, Demodulation Reference Signal, DMRS, ports. For instance, UE 110 may be configured with multiple TCI state configurations and each TCI state may contain parameters for configuring a QCL relationship between one or two downlink reference signals. Moreover, the TCI state of a CORESET may be provided to UE 110 using Radio Resource Control, RRC, or Media Access Control, MAC, signaling.

When UE 110 moves in a cell of BS 120, beam management procedures controlled by BS 120 may be performed to keep Transmit, TX, and Receive, RX, beams of BS 120 aligned with TX and RX beams of UE 110 over time. Both RX and TX beams of UE 110 may be assumed to be determined based on downlink Reference Signals, RSs. Thus, a TX/RX beam correspondence at UE 110 may be exploited to determine a TX beam of UE 110. That is to say, UE 110 may use as the TX beam the RX beam used to receive certain downlink RSs. Furthermore, UE 110 may be served in downlink using the same TX beam of BS 120 that was used as a RX beam of BS 120 for reception of uplink transmissions, i.e. the same beam pair link may be used for both downlink and uplink. However, in some example embodiments, UE 110 may need to transmit with lower transmission power to a certain direction (e.g. towards the human body) due to maximum permittable emission limits at UE 110 for example, and thus different beam pair links (TX-RX beam pairs of UE 110 and BS 120) may need to be used in downlink and uplink.

Various challenges relate to beam management though. Beam management should not cause high overhead and inefficiency in downlink and uplink beam tracking and switching functionality, especially in case of high mobility. Moreover, beam management procedures should not be complex but still enable fast and dynamic beam switching.

Embodiments of the present invention therefore enable efficient beam management with low overhead. A separate signaling procedure for multiple signal types, such as for each downlink and uplink signal and channel, can be avoided. Furthermore, a single spatial source may be exploited for multiple signal types, thereby enabling a simple procedure and fast and dynamic beam switching, which is particularly useful for high mobility cases. Some embodiments of the present invention facilitate improved intra-cell mobility for example. Embodiments of the present invention may be exploited at least in 5G/NR networks, wherein currently a separate signaling procedure is used for each signal and channel.

According to embodiments of the present invention, at least one anchor CORESET may be used to reduce overhead and improve efficiency in downlink and uplink beam tracking and switching functionality. The at least one anchor CORESET may be configured, e.g., as a mobility anchor for UE 110. In some example embodiments, multiple signal types comprising downlink and uplink signals and channels, such as PUCCH, SRS and PUSCH in uplink and CSI-RS, PDCCH and PDSCH in downlink, may inherit, i.e., follow, a spatial/QCL/TCI source of the at least one anchor CORESET if a given signal type (signal/channel resource) is configured to inherit the spatial source of the at least one anchor CORESET. The inherited spatial/QCL/TCI source may be a current active TCI state of the at least one anchor CORESET. That is to say, the inherited spatial/QCL/TCI source may define a TCI state for the given signal type.

Said multiple signal types may comprise downlink and uplink signals and channels may comprise all, or various combinations, of PUCCH, SRS and PUSCH in uplink and CSI-RS, PDCCH and PDSCH in downlink. For instance, said multiple signal types may comprise PUCCH, SRS, CSI-RS and PDCCH. Alternatively, said multiple signal types may comprise SRS, PUSCH, CSI-RS and PDSCH. As another option, said multiple signal types may comprise PUCCH, SRS, CSI-RS and PDSCH.

In some example embodiments, the inherited spatial/QCL/TCI source may be applied over multiple slots for the given signal type. That is to say, the spatial source (and the QCL assumption) of the at least one anchor CORESET may not change from slot to slot depending on a search space configuration when to monitor a certain CORESET. Moreover, the inherited spatial/QCL/TCI source may be applied regardless of a TCI state of a CORESET with a lowest identity, monitored in the latest slot by UE 110 for example. Therefore, the spatial source (and the anchor QCL assumption) for DL and UL signals may be controlled. The inherited spatial/QCL/TCI source may be applied independently, i.e., regardless of a scheduling offset, when UE 110 is configured and activated with the at least one anchor CORESET.

Moreover, in some example embodiments, there may be multiple anchor CORESETs in one serving cell of BS 120, the serving cell of UE 110. In such a case, a CORESET number zero (CORESET #0) may be associated with the serving cell of UE 110. The serving cell of UE 110 may have multiple TRPs, i.e., there may be multiple anchor CORESETs per serving cell of UE 110 as well.

In some example embodiments, said multiple anchor CORESETs may be set to a priority order, i.e., said multiple anchor CORESETs may have a different priority. For instance, CORESET #0 may have the highest priority among said multiple anchor CORESETs. Multiple anchor CORESETs may be configured with a specific prioritization order by a network, such as BS 120, by using a high layer parameter. That is to say, said different priorities of the multiple anchor CORESETs may be based on an indication, such as the higher layer parameter, received from the network by UE 110. Thus, multi-Transmission and Reception Point, TRP, connection and multiple active beam pair links for the UE can be supported (one beam pair link for one TRP and second beam pair link for the other TRP).

In some example embodiments, the indication, such as 'Anchor-CORESETPriorityOrder', may have a length of K elements. Each element may define a value associated with the priority order, the value defining how said multiple anchor CORESETs are ordered. For example, in the case of three anchor CORESETs K=3, Anchor-CORESETPriorityOrder=[1, 3, 2] means that an anchor CORESET #1 has the highest priority and an anchor CORESET #2 has the third highest priority and an anchor CORESET #3 has the second highest priority.

Prioritization may be beneficial for example if UE 110 is measuring non-serving cells using one antenna panel. In such a case, UE 110 may be required to use at least one antenna panel to monitor the serving cell and an anchor CORESET with the highest priority. In addition, if UE 110 is configured in connected mode with Discontinuous Reception, DRX, UE 110 may monitor and assume only highest priority anchor CORESET when performing monitoring or transmitting operations during non-active time of a DRX cycle. Hence, prioritization may be used for example to enable efficient operation of UE 110 when DRX is configured.

In some example embodiments, a cell of BS 120 may be a multi-Downlink Control Information, DCI, based multi-TRP supported cell. In such a case, multiple CORESETs may be grouped in multiple groups and value with a parameter, such as an index, like a higher layer parameter CORESETpoolIndex, may be assigned for each group by the network. If an anchor CORESET is configured for a group, other CORESETs within the group may inherit the spatial source from the anchor CORESET of the group. Said other CORESETs within the group may not be assigned as an anchor CORESET. That is to say, if multiple CORESETs are grouped in multiple groups, and one CORESET in each group is assigned as the anchor CORESET for the group, other CORESETs in the group may inherit the spatial source from the assigned anchor CORESET of the group.

Grouping of CORESETs enables assigning CORESET(s) for different TRPs. One of the CORESETs per TRP may then be an anchor CORESET and all other CORESETs may inherit the spatial source from the anchor CORESET of the same group, thereby providing low overhead and efficiency as the network needs to update (e.g., beam switch) only the anchor CORESET and other CORESETs of the same group would follow the anchor CORESET. That is to say, each group may be associated with a different TRP.

In some example embodiments, UE 110 may be configured by the network with an additional anchor CORESET of a non-serving cell, e.g., for inter-cell multi-TRP connection and/or mobility. In such a case, a priority of the additional anchor CORESET of the non-serving cell may be configured or set/predefined as higher than any other anchor CORESET than a highest priority anchor CORESET of the serving cell. In some embodiments, the additional anchor CORESET of the non-serving cell cannot be configured without the anchor CORESET of the serving cell though, i.e., the anchor CORESET of the serving cell needs to be configured to be able to exploit an additional anchor CORESET in a non-serving cell.

After explicit activation of the additional anchor CORESET(s) of the non-serving cell, by the non-serving cell, UE 110 may take the priority of the additional anchor CORESET(s) of the non-serving cell into account when UE 110 counts Control Channel Element, CCE, and/or channel estimation budgets, and determines which CORESETs and associated search space sets to drop if the budget(s) went over a set limit within a slot. In other words, the additional, configured CORESET(s) of the non-serving cell may be kept as reserved until an activation command is received from the non-serving cell by UE 110, i.e., the additional, configured CORESET(s) of the non-serving cell are activated by the non-serving cell. Upon the activation, anchor CORESET(s) with the least priority may be dropped.

In some example embodiments, a determination of a default beam when a scheduling offset is less than a threshold, such as timeDurationForQCL, may depend on whether or not at least one anchor CORESET is configured and activated. If the at least one anchor CORESET is configured and activated, UE 110 may determine an active TCI state of the at least one anchor CORESET as the default beam. However, if the at least one anchor CORESET is not configured and activated, UE 110 may determine a CORESET with a lowest identity as the default beam.

Default beam may refer to a notation for a default configuration for the case when UE 110 does not have time to switch for a certain receive beam after receiving PDCCH on some other beam. Hence operation is enabled for a multi-TRP case with multiple default beams.

Figure 2:
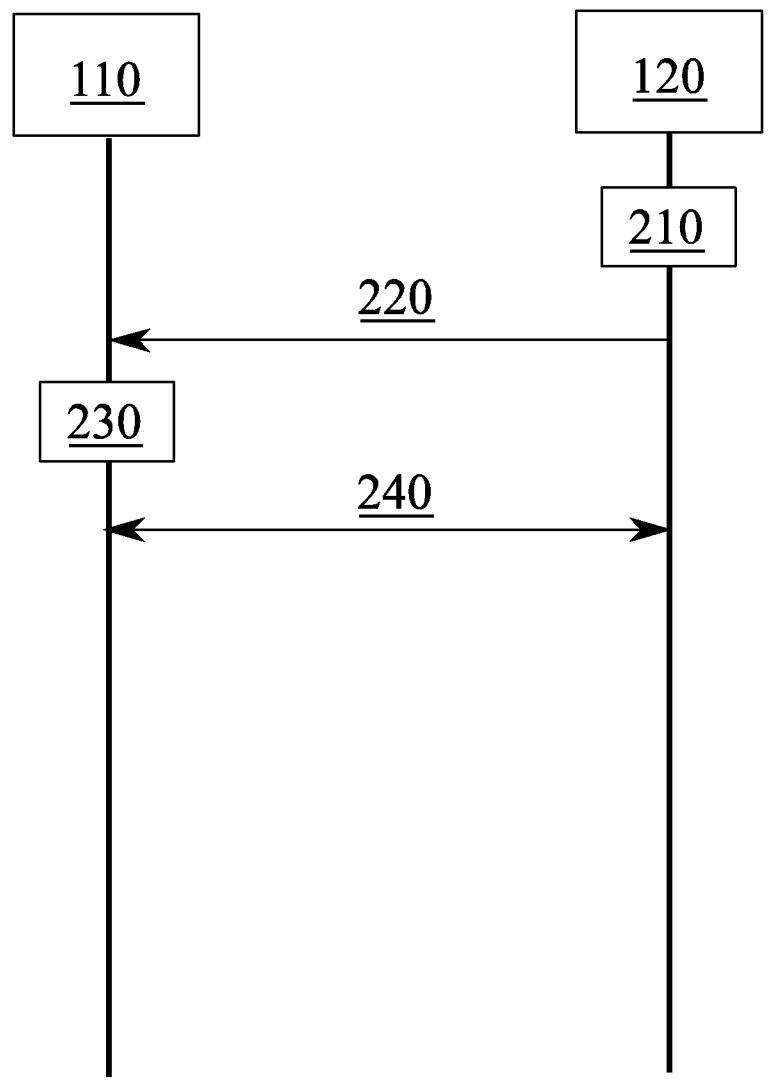
FIG. 2 illustrates a process in accordance with at least some embodiments.

FIG. 2 illustrates a process in accordance with at least some embodiments. On the vertical axes are disposed, from the left to the right, UE 110 and BS 120 of FIG. 1. Time advances from the top towards the bottom.

At optional step 210, BS 120 may choose/assign at least one CORESET as at least one anchor CORESET. If one anchor CORESET is chosen/assigned, a spatial source of said one anchor CORESET may be a single spatial source for multiple signal types such as PUCCH, SRS and PUSCH in uplink and CSI-RS, PDCCH and PDSCH in downlink. If multiple anchor CORESETs are chosen/assigned by BS 120, e.g., in one cell of BS 120, each of said multiple CORESETs may define a spatial source for said multiple signal types. Said multiple anchor CORESETs may have a different priority. For instance, a CORESET number zero (CORESET #0) may have the highest priority.

In some example embodiments, multiple CORESETs may be grouped by BS 120 into multiple groups, and one CORESET in each group may be assigned as the anchor CORESET for the group and other CORESETs in the group may inherit the spatial source from the assigned anchor CORESET of the group.

At optional step 220, BS 120 may configure UE 110 by transmitting a configuration to UE 110, the configuration indicating the at least one anchor CORESET chosen/assigned by BS 120. If multiple anchor CORESETs were chosen/assigned by BS 120 at step 210, BS 120 may also transmit an indication about different priorities of said multiple anchor CORESETs to UE 110. Alternatively, or in addition, if multiple CORESETs were grouped into multiple groups, BS 120 may transmit an indication about said groups and indicate which CORESET in each group is assigned as the anchor CORESET for the group.

At step 230, UE 110 may determine at least one anchor CORESET among a plurality of CORESETs, wherein the at least one anchor CORESET may define a spatial source for multiple signal types, said multiple signal types comprising different downlink and uplink signals and channels. In some example embodiments, UE 110 may determine the at least one anchor CORESET based on the configuration received from BS 120 at step 220 for example. Alternatively, the at least one anchor CORESET may be fixed, e.g., defined in a standard, such as a 3GPP standard specification, and UE 110 may determine the at least one anchor CORESET based on the standard, e.g., CORESET #0.

UE 110 may also determine whether or not a given signal type, such as for the uplink signal transmission PUCCH, SRS or PUSCH and for the downlink signal reception CSI-RS, PDCCH or PDSCH, is to inherit, i.e., follow, a spatial source of the at least one anchor CORESET. That is to say, only a subset of one or more of all signal types may inherit the spatial source of the at least one anchor CORESET. So if the given signal type is one of the mentioned signal types for example, UE 110 may determine that the signal type is to inherit the spatial source of the at least one anchor CORESET, i.e., make a positive determination.

In case of a positive determination, UE 110 may apply the spatial source of the at least one anchor CORESET for the given signal type. For instance, UE 110 may determine an active TCI state of the at least one anchor CORESET and apply the active TCI state of the anchor CORESET for the given signal type. That is to say, the spatial source of the at least one anchor CORESET may define a TCI state for the given signal type. The inherited spatial source may be a current active TCI state of the at least one anchor CORESET for example. UE 110 may determine an active TCI state of the at least one anchor CORESET based on the at least one anchor CORESET, because one of the parameters of the at least one anchor CORESET is the active TCI state. Moreover, a set of signals that are associated with a certain anchor CORESET may be used to determine the spatial source of said set of signals to be the TCI state of the anchor CORESET in question.

However, in case of a negative determination, UE 110 may decide not to apply the spatial source of the at least one anchor CORESET for the given signal type, because all possible signal types may not inherit the spatial source of the at least one anchor CORESET. Some signal types may not be configured to inherit the spatial source of the at least one anchor CORESET all the time for example. For instance, some signal types may be separately configured to inherit the spatial source, i.e., the TCI state, from the at least one anchor CORESET.

If the at least one anchor CORESET comprises multiple anchor CORESETs in one cell, said multiple anchor CORESETs having a different priority, UE 110 may first check if the spatial source of an anchor CORESET with a highest priority can be applied for the given signal type. If not, UE 110 may check if the spatial source of an anchor CORESET with a second highest priority can be applied for the given signal type, and so on. UE 110 may for example determine whether the spatial source of the anchor CORESET with the highest priority can be applied by checking from a signal/channel configuration what the anchor CORESET.

At step 240, UE 110 may apply the spatial source of the at least one anchor CORESET for the given signal type upon determining that the given signal type is to inherit a spatial source of the at least one anchor CORESET. For instance, in case of uplink signal transmission to BS 120, such as PUCCH, SRS, PUSCH, UE 110 may adjust its transmission parameters by taking into account the spatial source of the at least one anchor CORESET.

In case of downlink signal reception from BS 120, such as CSI-RS, PDCCH, PDSCH, UE 110 may assume that the at least one anchor CORESET and the given signal are transmitted by the same TRP applying the same spatial filter. Thus, UE 110 may assume that that the at least one anchor CORESET and a signal of the given signal type would go through similar channel conditions and have similar channel properties. Consequently, UE 110 may apply the channel properties, such as Doppler shift, Doppler spread, average delay, delay spread and/or spatial RX parameter(s), of the at least one anchor CORESET to detect the given signal.

Similarly, BS 120 may transmit downlink signals of said multiple signal types and receive uplink signals of said multiple signal types according to the at least one anchor CORESET. For example, BS 120 may form its receive beam according to the spatial source of the at least one anchor CORESET for reception of uplink signals associated with the at least one anchor CORESET. That is to say, both UE 110 and BS 120 may consider the signals of said multiple signal types and the at least one anchor CORESET as QCL'ed.

In some example embodiments, a new RRC message may be introduced, for example in 3rd GPP standard specification TS 38.331, per downlink and uplink indicating, when explicitly configured, that from which CORESET to inherit the spatial source (active TCI state of the given CORESET) for the reception and transmission.

In some example embodiments, behaviour of UE 110 may be captured, for example in 3rd GPP standard specification TS 38.213 and/or 38.214, when explicitly configured the CORESET from to inherit the spatial source, that UE 110 determines and applies the inherited spatial source (active TCI state of the given CORESET) for the uplink signal transmission (PUCCH, SRS, PUSCH) and for the downlink signal reception (CSI-RS, PDCCH, PDSCH).

Figure 3:
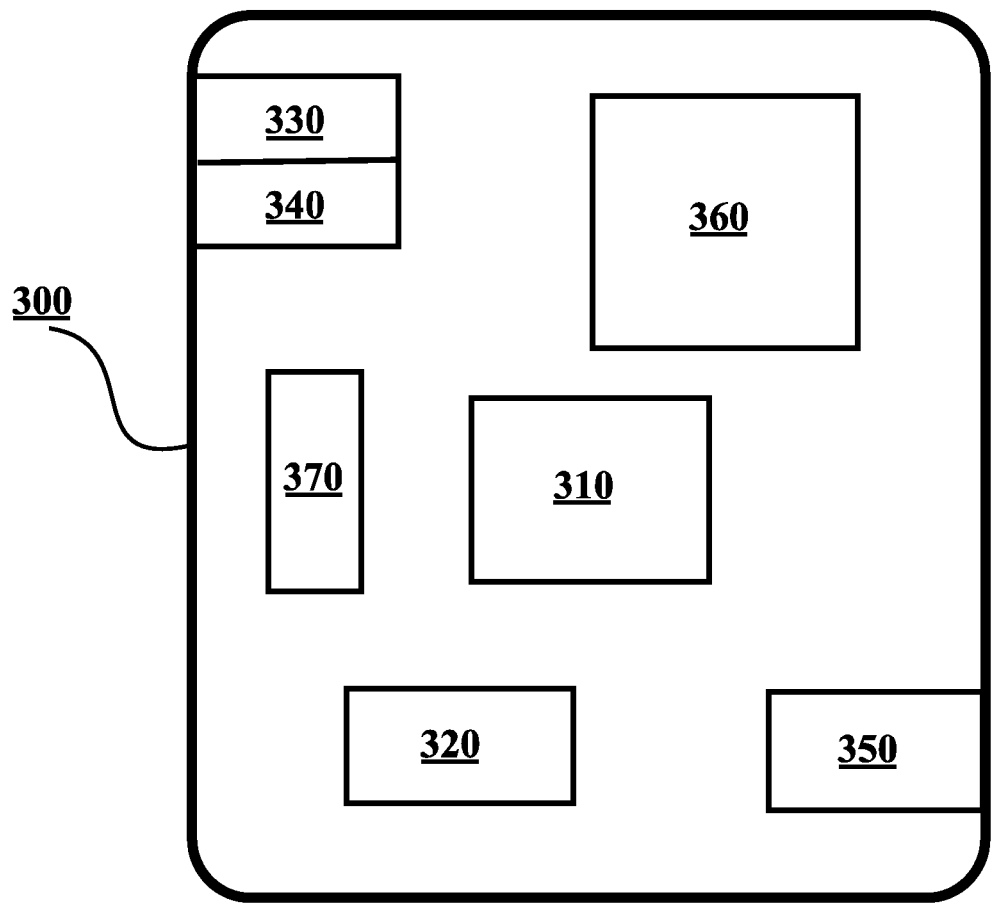
FIG. 3 illustrates an example apparatus capable of supporting at least some embodiments.

FIG. 3 illustrates an example apparatus capable of supporting at least some embodiments. Illustrated is device 300, which may comprise, for example, UE 110 or BS 120. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, and/or 5G/NR standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the embodiments.

Figure 4:
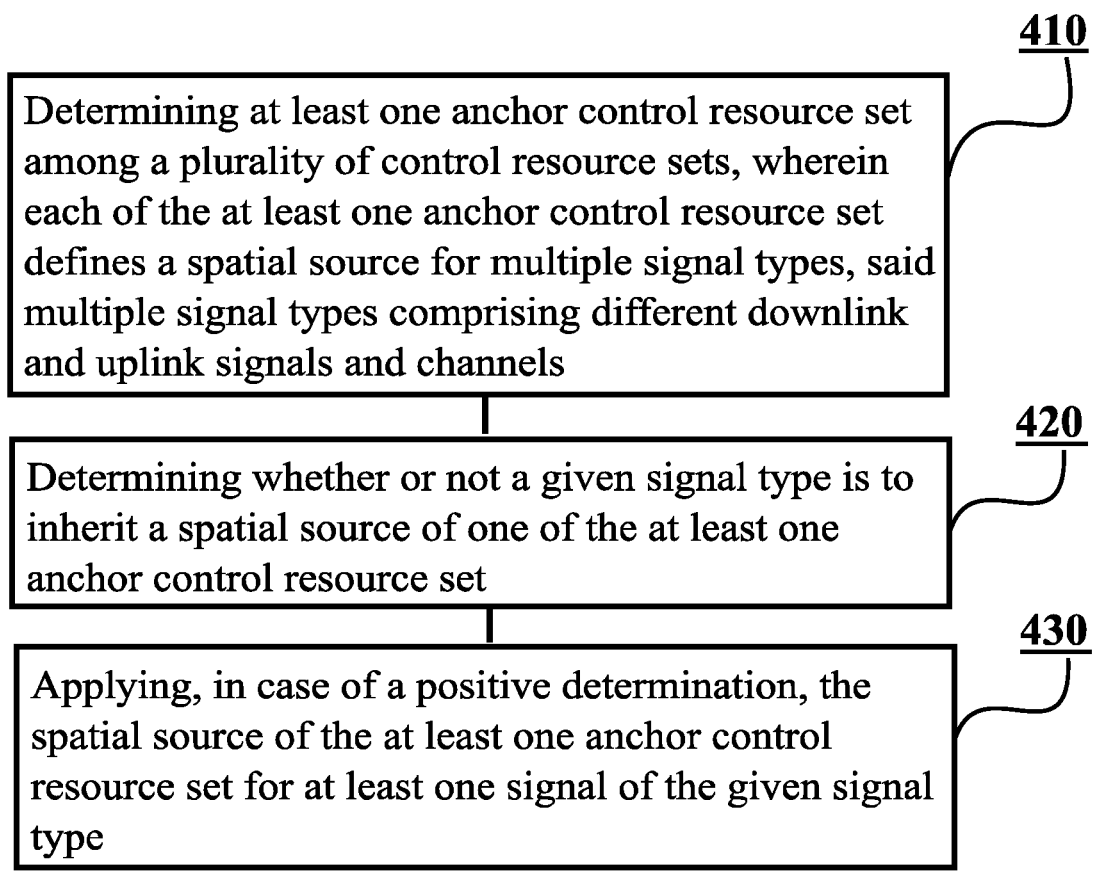
FIG. 4 illustrates a flow graph of a first method in accordance with at least some embodiments.

FIG. 4 is a flow graph of a first method in accordance with at least some embodiments. The phases of the illustrated first method may be performed by UE 110 or a MT part of a relay, or by a control device configured to control the functioning thereof, possibly when installed therein.

The first method may comprise, at step 410, determining at least one anchor control resource set among a plurality of control resource sets, wherein each of the at least one anchor control resource set defines a spatial source for multiple signal types, said multiple signal types comprising different downlink and uplink signals and channels. The first method may also comprise, at step 420, determining whether or not a given signal type is to inherit a spatial source of one of the at least one anchor control resource set. Finally, the first method may comprise, at step 430, applying, in case of a positive determination, the spatial source of the at least one anchor control resource set for at least one signal of the given signal type.

FIG. 5 is a flow graph of a second method in accordance with at least some embodiments. The phases of the illustrated second method may be performed by BS 120 or a DU part of a relay, or by a control device configured to control the functioning thereof, possibly when installed therein.

The second method may comprise, at step 510, determining at least one anchor control resource set among a plurality of control resource sets, wherein each of the at least one anchor control resource set defines a spatial source for multiple signal types, said multiple signal types comprising different downlink and uplink signals and channels. The second method may also comprise, at step 520, transmitting downlink signals and receiving uplink signals of said multiple signal types according to a spatial source of the at least one anchor control resource set.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or BS 120, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or BS 120, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, for example in 3GPP networks, wherein beamforming is used.

ACRONYMS LIST

3GPP 3rd Generation Partnership Project
BS Base Station
CORESET Control Resource Set
CSI-RS Channel State Information-Reference Signal
DMRS Demodulation Reference Signal
GSM Global System for Mobile communication
IAB Integrated Access and Backhaul
IoT Internet of Things
LTE Long-Term Evolution
M2M Machine-to-Machine
MAC Media Access Control
NFC Near-Field Communication
NR New Radio
PBCH Physical Broadcast Channel
PDCCH Physical Downlink Control Channel
PDSCH Physical Downlink Shared Channel
PUCCH Physical Uplink Control Channel
PUSCH Physical Uplink Shared Channel
QCL Quasi Co-Location
RAN Radio Access Network
RAT Radio Access Technology
RRC Radio Resource Control
SRS Sounding Reference Signal
SS Synchronization Signal
TCI Transmission Configuration Indicator
TRP Transmission and Reception Point
UE User Equipment
UI User Interface
WCDMA Wideband Code Division Multiple Access

| REFERENCE SIGNS LIST | |
| --- | --- |
| 110 | User Equipment |
| 115 | Beams |
| 120 | Base Station |
| 125, 135 | Wired interfaces |
| 130 | Core Network |
| 210-240 | Steps in the process of FIG. 2 |
| 300-370 | Structure of the apparatus of FIG. 3 |
| 410-430 | Phases of the first method in FIG. 4 |
| 510-520 | Phases of the second method in FIG. 5 |

The invention claimed is:

1. An apparatus comprising:
   at least one processing core;
   at least one memory including computer program code, the at least one memory and the computer program code being configured to, with the at least one processing core, cause the apparatus at least to perform:
      determine at least one anchor control resource set among a plurality of control resource sets, wherein each of the at least one anchor control resource set defines a spatial source for multiple signal types, said multiple signal types comprising different downlink and uplink signals and channels, wherein the at least one anchor control resource set is a control resource set of a serving cell and the apparatus is configured with an additional anchor control resource set of a non-serving cell, a priority of the additional anchor control resource set of the non-serving cell being less than a highest priority anchor control resource set of the serving cell but higher than a priority of any other anchor control resource set, and wherein multiple control resource sets are grouped in multiple groups with each group in the multiple groups being associated with a different transmission and reception point, and one control resource set in each of the multiple groups is assigned as an anchor control resource set for a group and other control resource sets in the group inherit the spatial source from the assigned anchor control resource set of the group;
      activate the additional anchor control resource set of a non-serving cell based on an activation command received from the non-serving cell;
      determine that a given signal type is to inherit a spatial source of one of the at least one anchor control resource set, wherein only a subset of all signal types inherits the spatial source of the at least one anchor control resource set; and
      apply the spatial source of the at least one anchor control resource set for at least one signal of the given signal type.

2. The apparatus according to claim 1, wherein the spatial source of said one of the at least one anchor control resource set defines a transmission configuration indication state for the given signal type.

3. The apparatus according to claim 2, wherein the spatial source of said one of the at least one anchor control resource set is applied regardless of a scheduling offset when the apparatus is configured and activated with the at least one anchor control resource set.

4. The apparatus according to claim 2, wherein the spatial source of said one of the at least one anchor control resource set is applied regardless of whether said one of the at least one anchor control resource set is a control resource set with a lowest identity.

5. The apparatus according to claim 4, wherein the at least one anchor control resource set comprises only one anchor control resource set and the spatial source of said one anchor control resource set is a single spatial source for said multiple signal types.

6. The apparatus according to claim 5, wherein the at least one anchor control resource set comprises multiple anchor control resource sets in one cell, said multiple anchor control resource sets having different priorities.

7. The apparatus according to claim 6, wherein a control resource set number zero has a highest priority.

8. The apparatus according to claim 7, wherein the apparatus is a user equipment or a mobile termination part of a relay, or a control device configured to control a functioning thereof.

9. A system comprising:
an apparatus;
at least one processor;
at least one memory including computer program code, the at least one memory and the computer program code being configured to, with the at least one processing, cause the apparatus at least to perform:
  determine at least one anchor control resource set among a plurality of control resource sets, wherein each of the at least one anchor control resource set defines a spatial source for multiple signal types, said multiple signal types comprising different downlink and uplink signals and channels, wherein the at least one anchor control resource set is a control resource set of a serving cell and the apparatus is configured with an additional anchor control resource set of a non-serving cell, a priority of the additional anchor control resource set of the non-serving cell being less than a highest priority anchor control resource set of the serving cell but higher than a priority of any other anchor control resource set, and wherein multiple control resource sets are grouped in multiple groups with each group in the multiple groups being associated with a different transmission and reception point, and one control resource set in each of the multiple groups is assigned as an anchor control resource set for a group and other control resource sets in the group inherit the spatial source from the assigned anchor control resource set of the group;
  activate the additional anchor control resource set of a non-serving cell based on an activation command received from the non-serving cell;
  determine that a given signal type is to inherit a spatial source of one of the at least one anchor control resource set, wherein only a subset of all signal types inherits the spatial source of the at least one anchor control resource set; and
  apply the spatial source of the at least one anchor control resource set for at least one signal of the given signal type.

10. A method comprising:
determining, by an apparatus, at least one anchor control resource set among a plurality of control resource sets, wherein each of the at least one anchor control resource set defines a spatial source for multiple signal types, said multiple signal types comprising different downlink and uplink signals and channels, wherein the at least one anchor control resource set is a control resource set of a serving cell and the apparatus is configured with an additional anchor control resource set of a non-serving cell, a priority of the additional anchor control resource set of the non-serving cell being less than a highest priority anchor control resource set of the serving cell but higher than a priority of any other anchor control resource set, and wherein multiple control resource sets are grouped in multiple groups with each group in the multiple groups being associated with a different transmission and reception point, and one control resource set in each of the multiple groups is assigned as an anchor control resource set for a group and other control resource sets in the group inherit the spatial source from the assigned anchor control resource set of the group;
activating, by the apparatus, the additional anchor control resource set of a non-serving cell based on an activation command received from the non-serving cell;
determining, by the apparatus, that a given signal type is to inherit a spatial source of one of the at least one anchor control resource set, wherein only a subset of all signal types inherits the spatial source of the at least one anchor control resource set; and
applying, by the apparatus, the spatial source of the at least one anchor control resource set for at least one signal of the given signal type.

* * * * *